(12) United States Patent
Baik et al.

(10) Patent No.: US 9,035,043 B2
(45) Date of Patent: May 19, 2015

(54) METHOD OF PREPARING CATIONIC STARCH USING ULTRAHIGH PRESSURE

(71) Applicant: University-Industry Cooperation Group of Kyung Hee University, Gyeonggi-do (KR)

(72) Inventors: Moo Yeol Baik, Gyeonggi-do (KR); Yoon Je Chang, Gyeonggi-do (KR); Byung Yong Kim, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 6 days.

(21) Appl. No.: 14/020,336

(22) Filed: Sep. 6, 2013

(65) Prior Publication Data

US 2014/0350236 A1    Nov. 27, 2014

(30) Foreign Application Priority Data

May 24, 2013    (KR) .................. 10-2013-0059298

(51) Int. Cl.
*C08B 31/00* (2006.01)
*C08B 31/12* (2006.01)

(52) U.S. Cl.
CPC .................. *C08B 31/125* (2013.01)

(58) Field of Classification Search
None
See application file for complete search history.

(56) References Cited

FOREIGN PATENT DOCUMENTS

| JP | 06100603 A | 4/1994 |
|---|---|---|
| JP | 10-507790 A | 4/1997 |
| JP | 10507790 A | 7/1998 |
| KR | 100224038 A | 7/1999 |
| KR | 100893568 B1 | 4/2004 |
| KR | 100887699 B1 | 3/2009 |
| KR | 100893571 B1 | 4/2009 |

OTHER PUBLICATIONS

Office Action dated Jun. 18, 2014, for Korean counterpart Application No. 10-2013-0059298.
Notice of Allowance dated Nov. 20, 2014 for corresponding Korean Application No. 10-2013-0059298.

*Primary Examiner* — Layla Bland
(74) *Attorney, Agent, or Firm* — Kinney & Lange, P.A.

(57) ABSTRACT

Disclosed is a method of preparing cationic starch. The method includes preparing a starch suspension containing a cationization agent; performing ultrahigh pressure treatment on the starch suspension; and obtaining cationic starch from the starch suspension subjected to ultrahigh pressure treatment.

11 Claims, 15 Drawing Sheets

METHOD OF PREPARING CATIONIC STARCH USING ULTRAHIGH PRESSURE

CROSS-REFERENCE TO RELATED APPLICATION

This application claims priority to Korean Patent Application No. 10-2013-0059298 filed on 24 May, 2013, and all the benefits accruing therefrom under 35 U.S.C. §119, the contents of which is incorporated by reference in its entirety.

BACKGROUND

1. Technical Field

The present invention relates to a method of preparing cationic starch using ultrahigh pressure.

2. Description of the Related Art

Starch, which is made up of biomacromolecules obtained from plants such as corn, potato, sweet potato, tapioca and the like, supplies 70 to 80% of calories ingested by mankind.

Native starch is limited in utilization as native starch is not dissolved into water and tends to be in the form of an unstable gel. In order to use native starch more effectively, modified starch having new physical properties is prepared through physical or chemical modification. Examples of the modified starch may include starch acetate (Korean Patent No. 10-0893568), hydroxypropylated starch (Korean Patent No. 10-0887699), crosslinked starch, cationic starch, and the like.

While researching an improved method of preparing cationic starch, the inventors have found that cationic starch having specific physical properties could be prepared efficiently using ultrahigh pressure.

BRIEF SUMMARY

An aspect of the present invention is to provide a method of preparing cationic starch.

In accordance with one aspect of the present invention, a method of preparing cationic starch using ultrahigh pressure is provided.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
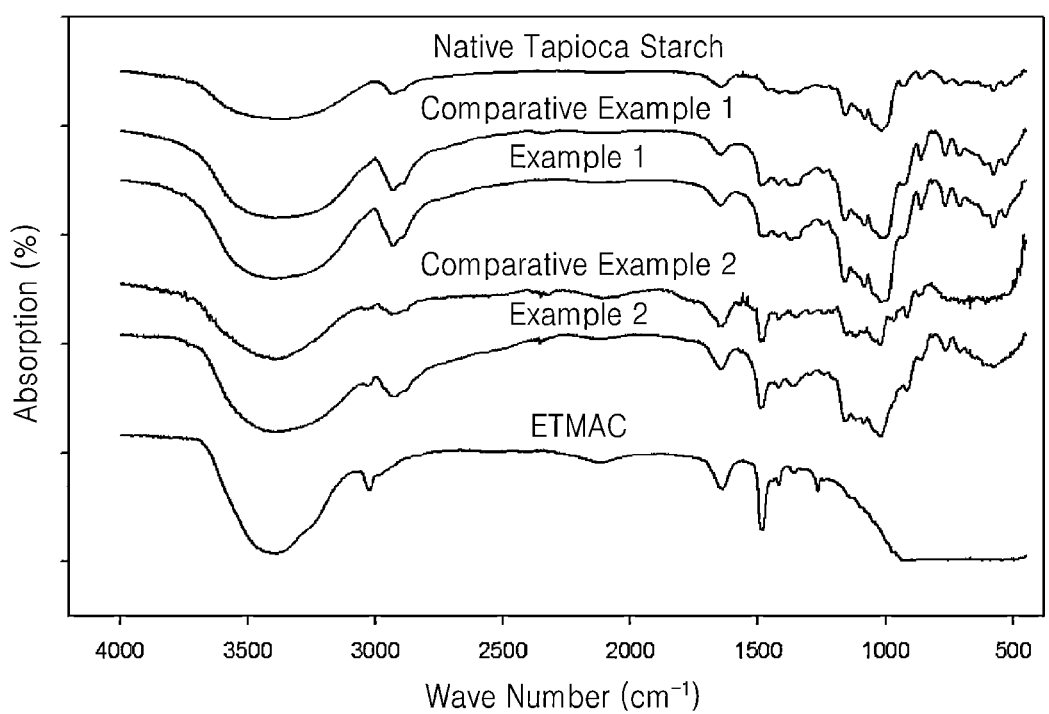
FIG. 1 is FT-IR analysis results of cationic tapioca starch.

The present invention relates to a method of preparing cationic starch that includes preparing a starch suspension containing a cationization agent, subjecting the starch suspension to ultrahigh pressure treatment, and obtaining cationic starch from the starch suspension subjected to ultrahigh pressure treatment.

Hereinafter, the present invention will be described in detail.

Preparation of Starch Suspension

A starch suspension containing a cationization agent is prepared by adding a cationization agent and starch to distilled water. Here, ultrahigh pressure treatment is performed after further adding a reaction initiator to the starch suspension.

The starch suspension includes 150 parts by weight to 600 parts by weight of water based on 100 parts by weight of dried starch. When water is added to the starch suspension in an amount of less than 150 parts by weight, viscosity of the starch suspension can be increased too much or an appropriate amount of water between starch granules is not provided, thereby making it difficult to perform cationization reaction that is substitution reaction, and when water is added to the starch suspension in an amount of more than 600 parts by weight, the concentration of the starch suspension is excessively decreased, thereby deteriorating cationization reactivity or efficiency.

Further, the cationization agent is added in an amount of 150 parts by weight to 300 parts by weight based on 100 parts by weight of dried starch. When the cationization agent is added in an amount of less than 150 parts by weight, the cationization reaction cannot be sufficiently performed, and when the cationization agent is added in an amount of more than 300 parts by weight, reaction efficiency can be deteriorated, as compared with the added amount of the cationization agent. The cationization agent may be ordinary cationization agents, without being limited thereto. According to the present invention, examples of the cationization agents may include compounds containing an amino group, an imino group, ammonium sulfonate, a phosphonium group, and the like, which have positive charges. For example, the cationization agent may be (4-chlorobutene-2)-trimethylammonium chloride, 2-diethylaminoethyl chloride, 2,3-(epoxypropyl)trimethyl ammonium chloride, (3-chloro-2-hydroxypropyl)trimethyl ammonium chloride, and the like. Preferably, the cationization agent is 2,3-(epoxypropyl)trimethyl ammonium chloride.

In the present invention, a reaction initiator is further added to the starch suspension to initiate the cationization reaction. The reaction initiator is preferably a basic reaction initiator, and examples of the reaction initiator may include sodium hydroxide, ammonium sulfate, tertiary amines, and the like.

The reaction initiator is added until pH of the starch suspension is in the range of 9.5 to 13, preferably in the range of 11 to 12. The cationization reaction has maximum efficiency when the pH of the starch suspension is in the range of 9.5 to 13.

Here, the reaction initiator may be added to the starch suspension before or after adding the cationization agent to the starch suspension according to user selection.

In the present invention, a starch suspension in which the cationization agent and the reaction initiator have been added is prepared and subjected to cationization reaction by performing ultrahigh pressure treatment. Here, a preparation temperature of the starch suspension can be controlled to control properties of cationic starch finally prepared. That is, cationic starch having high swelling power and strong cohesion between starch granules may be prepared when the granule structure of the starch is maintained by preparing the starch suspension at room temperature. On the other hand, cationic starch having a high solubility may be prepared when the granule structure of the starch is destroyed by preparing the starch suspension at high temperature. High temperature indicates temperatures at which the granule structure of the starch is destroyed, specifically from 45° C. to 80° C., preferably from 55° C. to 70° C. A person skilled in the art can obtain appropriate cationic starch by controlling temperature of the starch suspension as needed.

Ultrahigh Pressure Treatment

In the present invention, cationization reaction is conducted by performing ultrahigh pressure treatment of the starch suspension in which the cationization agent and the reaction initiator have been added.

Ultrahigh pressure treatment is performed by applying a pressure of 90 MPa to 1,000 MPa to the starch suspension for 30 seconds to 60 minutes, preferably applying a pressure of 100 MPa to 700 MPa thereto for 30 seconds to 30 minutes, more preferably applying a pressure of 200 MPa to 500 MPa thereto for 1 minute to 20 minutes. Here, it is efficient that the ultrahigh pressure treatment is performed at room temperature using water as a pressure transfer medium.

The ultrahigh pressure treatment may be performed at a temperature higher or lower than room temperature. In this case, however, an additional heating or cooling device is required, and cationization reaction efficiency is not substantially increased when considering costs or efforts for controlling the temperature. When the ultrahigh pressure treatment is performed for less than 30 seconds, the ultrahigh pressure treatment can be completed before the cationization reaction is sufficiently conducted, and when the ultrahigh pressure treatment is performed for more than 60 minutes, reaction efficiency can be reduced.

According to the present invention, it is advantageous to produce cationic starch at industrial scale due to merits of a short reaction time as well as a sufficient cationization reaction when performing the ultrahigh pressure treatment by applying a pressure of 90 MPa to 1,000 MPa to the starch suspension for 30 seconds to 60 minutes.

Obtaining Cationic Starch

Cationic starch produced through the ultrahigh pressure treatment is obtained by washing and drying the starch suspension.

The above and other advantages and features of the present invention will become clear with reference to the following examples and experimental examples. However, it should be understood that the present invention is not limited to the following examples and may be embodied in different ways, and that these examples are given to provide complete disclosure of the invention and to provide thorough understanding of the invention to those skilled in the art. The scope of the invention is limited only by the accompanying claims and equivalents thereof.

Material and Method

Commercially available native tapioca starch and native cornstarch were obtained and used.

Example 1

38.27 g of 2,3-epoxypropyltrimethylammonium chloride (ETMAC) as a cationization agent was added to 41.32 g of distilled water. 20 g of tapioca starch was added to the cationization agent-added solution to prepare a starch suspension. 10% NaOH was added to the starch suspension until pH reached 11.5. The cationization agent-added starch suspension was placed in a plastic pouch, sealed, and uniformly shaken. Then, with the pouch containing the starch suspension placed in an ultrahigh pressure device, a pressure of 500 MPa was applied to the starch suspension at room temperature (25° C.) for 10 minutes using distilled water as a pressure transfer medium. After the ultrahigh pressure treatment, the sample was washed several times with an amount of isopropanol equal to three times the volume of dry starch and dried and milled to obtain cationic starch, the granule structure of which was maintained.

Example 2

A starch suspension was prepared by adding 90 g of distilled water to 20 g of tapioca starch. 10 g of 10% NaOH was added to the starch suspension to control pH within the range of 9.5 to 13. The starch suspension and NaOH were reacted at 60° C. for 1 hour. 45 g of 2,3-epoxypropyltrimethylammonium chloride (ETMAC) as a cationization agent was added to the resultant. The cationization agent-added starch suspension was placed in a plastic pouch, sealed, and uniformly shaken. Then, with the pouch containing the starch suspension placed in an ultrahigh pressure device, a pressure of 500 MPa was applied to the pouch at room temperature (25° C.) for 10 minutes using distilled water as a pressure transfer medium. After the ultrahigh pressure treatment, the sample was washed several times with an amount of isopropanol equal to three times the volume of dry starch, and dried and milled to obtain cationic starch, the granule structure of which was destroyed.

Example 3

A cationic starch, the granule structure of which was maintained, was prepared in the same manner as in Example 1 except that cornstarch was used instead of tapioca starch.

Example 4

A cationic starch, the granule structure of which was destroyed, was prepared in the same manner as in Example 2 except that cornstarch was used instead of tapioca starch.

Comparative Example 1

38.27 g of 2,3-epoxypropyltrimethylammonium chloride (ETMAC) as a cationization agent was added to 41.32 g of distilled water. 20 g of tapioca starch was added to the cationization agent-added solution to prepare a starch suspension. 10% NaOH was added to the starch suspension until pH reached 11.5. The starch suspension and NaOH were reacted at 25° C. for 24 hours. After the reaction, the sample was washed several times with an amount of isopropanol equal to three times the volume of dry starch, and dried to obtain cationic starch as a white powder, the granule structure of which was maintained.

Comparative Example 2

A starch suspension was prepared by adding 90 g of distilled water to 20 g of tapioca starch. 10 g of 10% NaOH was added. The starch suspension and NaOH reacted at 60° C. for 1 hour. 45 g of 2,3-epoxypropyltrimethylammonium chloride (ETMAC) was added as a cationization agent. The starch suspension including the cationization agent was reacted at 60° C. for 5 hours. After the reaction, the sample was washed several times with an amount of isopropanol equal to three times the volume of dry starch, and dried and milled to obtain cationic starch, the granule structure of which was destroyed.

Comparative Example 3

A cationic starch, the granule structure of which was maintained, was prepared in the same manner as in Comparative Example 1 except that cornstarch was used instead of tapioca starch.

Comparative Example 4

A cationic starch, the granule structure which was destroyed, was prepared in the same manner as in Comparative Example 2 except that cornstarch was used instead of tapioca starch.

Experimental Example 1

Degree of Substitution of Cationic Starch

Nitrogen content was obtained using a micro-Kjeldahl method and the degree of substitution degrees of the cationic starches prepared in Examples 1 to 4 and Comparative Examples 1 to 4. The degree of substitution (DS) was calculated according to Expression 1 to confirm the amount of the cationization agent substituted into the cationic starch.

Degree of substitution=(162×nitrogen content %)/{1400−(151.5×nitrogen content %)}    <Expression 1>

As a result, although the nitrogen content of native starch was higher in the cornstarch than in the tapioca starch, the nitrogen content of a substitution reaction-completed cationic starch was higher in the tapioca starch than in the cornstarch. From this result, it can be seen that the cationic tapioca starch has a higher degree of substitution than the cationic cornstarch.

On the other hand, in the case of cationic starch prepared at atmospheric pressure, it can be seen that the cationic starch, the granule structure of which was destroyed, (Comparative Examples 2 and 4) has a higher degree of substitution than the cationic starch, the granule structure of which was maintained (Comparative Examples 1 and 3). That is, since the cationic starch, the granule structure of which was maintained, reacted with a smaller amount of the cationization agent, whereas the cationic starch, the granule structure of which was destroyed, reacted with a larger amount of the cationization agent, the cationic starch, the granule structure of which was maintained, had a low nitrogen content and a low degree of substitution.

Further, among the cationic starches, the granule structure of which was maintained, the cationic starches (Comparative Examples 1 and 3) prepared in atmospheric pressure had a slightly lower degree of substitution than the cationic starches (Examples 1 and 3) prepared at ultrahigh pressure.

In the case of the cationic starch, the granule structure of which was destroyed, the cationic starches (Comparative Examples 2 and 4) prepared at atmospheric pressure had a much lower degree of substitution than the cationic starches (Examples 2 and 4) prepared to at ultrahigh pressure (Table 1).

TABLE 1

| Type of starch | | Starch (g) | Water (g) | NaOH (g) | ETMAC (60%)(g) | Nitrogen content (%) | Degree of substitution |
|---|---|---|---|---|---|---|---|
| Tapioca | Native starch | | | | | 0.09 ± 0.03 | 0.00 ± 0.00 |
| | Example 1 | 20.00 | 41.32 | 0.10 | 38.27 | 1.56 ± 0.13 | 0.22 ± 0.02 |
| | Example 2 | 20.00 | 99.00 | 1.00 | 45.00 | 4.18 ± 0.04 | 0.88 ± 0.02 |
| | Comparative Example 1 | 20.00 | 41.32 | 0.10 | 38.27 | 1.81 ± 0.11 | 0.26 ± 0.02 |
| | Comparative Example 2 | 20.00 | 99.00 | 1.00 | 45.00 | 5.40 ± 0.00 | 1.50 ± 0.00 |
| Corn | Native starch | | | | | 0.12 ± 0.00 | 0.00 ± 0.00 |
| | Example 3 | 20.00 | 41.32 | 0.10 | 38.27 | 1.65 ± 0.23 | 0.23 ± 0.04 |
| | Example 4 | 20.00 | 99.00 | 1.00 | 45.00 | 2.62 ± 0.03 | 0.42 ± 0.01 |
| | Comparative Example 3 | 20.00 | 41.32 | 0.10 | 38.27 | 1.71 ± 0.12 | 0.24 ± 0.02 |
| | Comparative Example 4 | 20.00 | 99.00 | 1.00 | 45.00 | 4.58 ± 0.27 | 1.05 ± 0.12 |

Experimental Example 2

FT-IR Analysis of Cationic Starch

FT-IR analysis of ETMAC was performed on native tapioca starch, native cornstarch and cationic starches of Examples 1 to 4 and Comparative Examples 1 to 4. FT-IR analysis was conducted using a PerkinElmer Spectrum One FT-IR system and a potassium bromide disc method.

Figure 2:
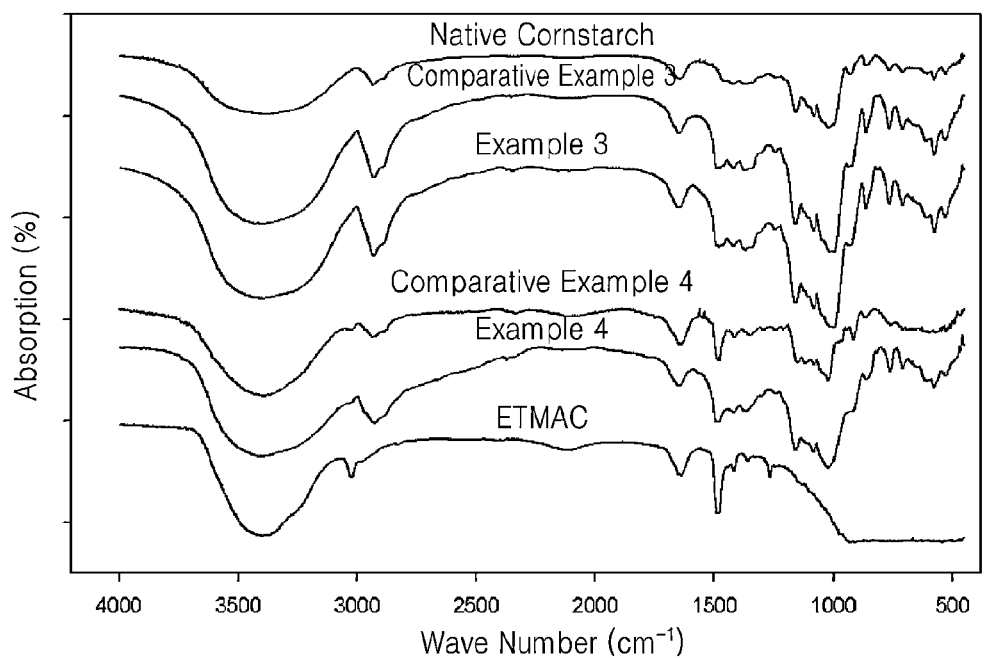
FIG. 2 is FT-IR analysis results of cationic cornstarch.

In FT-IR analysis results of ETMAC of FIG. 1 (tapioca starch) and FIG. 2 (cornstarch), peaks appear at 1480 cm$^{-1}$ due to C—N bonding. On the other hand, no peak appears at 1480 cm$^{-1}$ in the case of native tapioca starch and cornstarch. It can be seen that the cationic tapioca starch and the cornstarch show peaks near 1480 cm$^{-1}$ although both starches show similar patterns to those of the native starches. That is, since the cationic starches have starch as a backbone, the cationic starches have similar patterns to those of the native starches and show additional peaks due to substituted ETMAC. Further, it can be seen that the cationic starches (Comparative Examples), in which tapioca and corn were all prepared at atmospheric pressure, and the cationic starches (Examples) subjected to ultrahigh pressure treatment show similar FT-IR analysis results.

Experimental Example 3

Pasting Properties of Cationic Starch

Pasting properties of native starches of tapioca and corn and cationic starches of the present examples and the comparative examples were measured using a rapid viscosity analyzer (RVA-3D, Newport Scientific Pty Ltd, Australia).

Specifically, in an aluminum container, a sample and distilled water were completely stirred using a plastic rotational shaft to prepare a sample liquid. After being stirred at high speed for 1 minute in an RVA set to 50° C., the sample liquid was heated to 95° C. at a rate of 12° C. per minute, maintained at 95° C. for 2.5 minutes, cooled to 50° C., and left for 2 minutes to observe pasting properties of the sample liquid.

Figure 3:
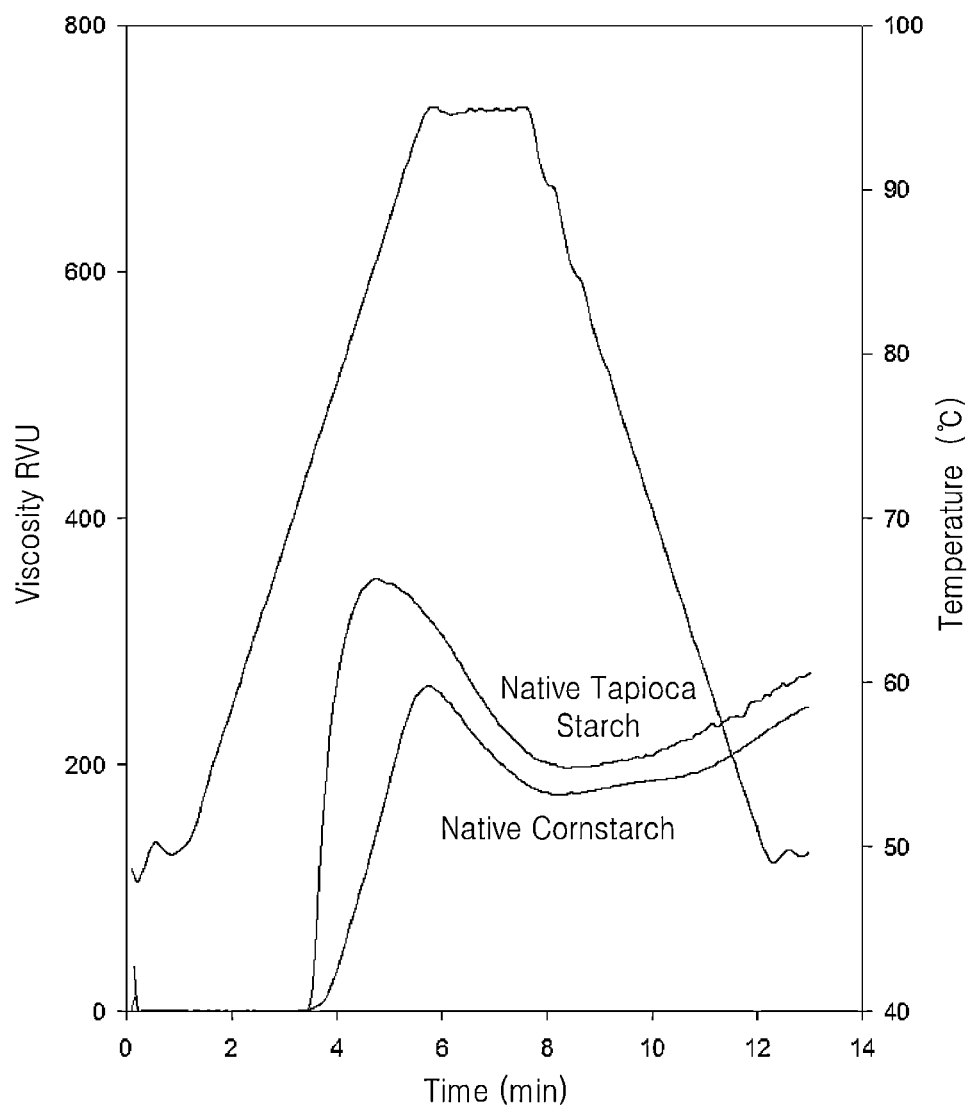
FIG. 3 is pasting property analysis results of native tapioca starch and cornstarch.
Figure 4:
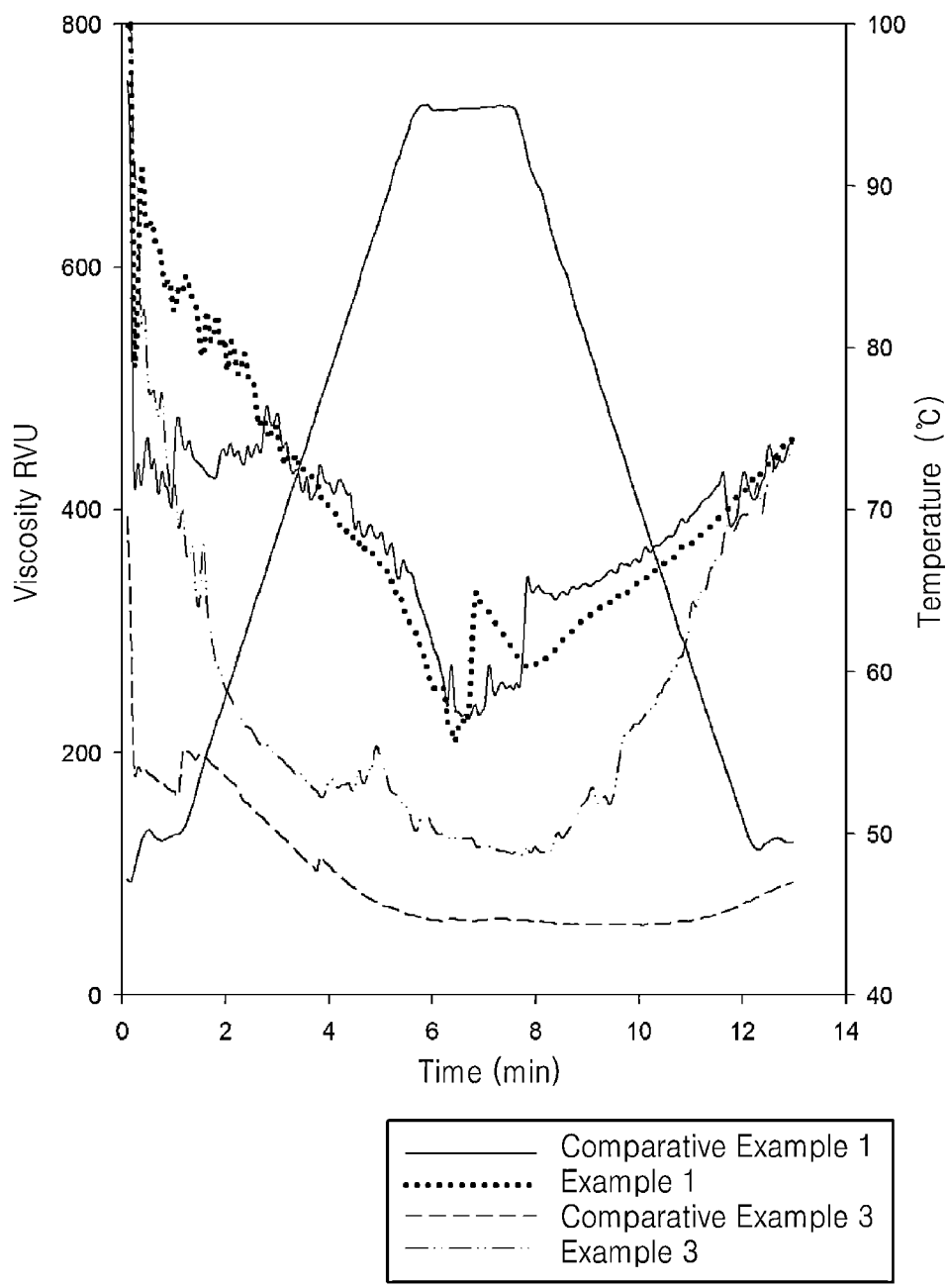
FIG. 4 is pasting property analysis results of cationic starches, granules of which are maintained.
Figure 5:
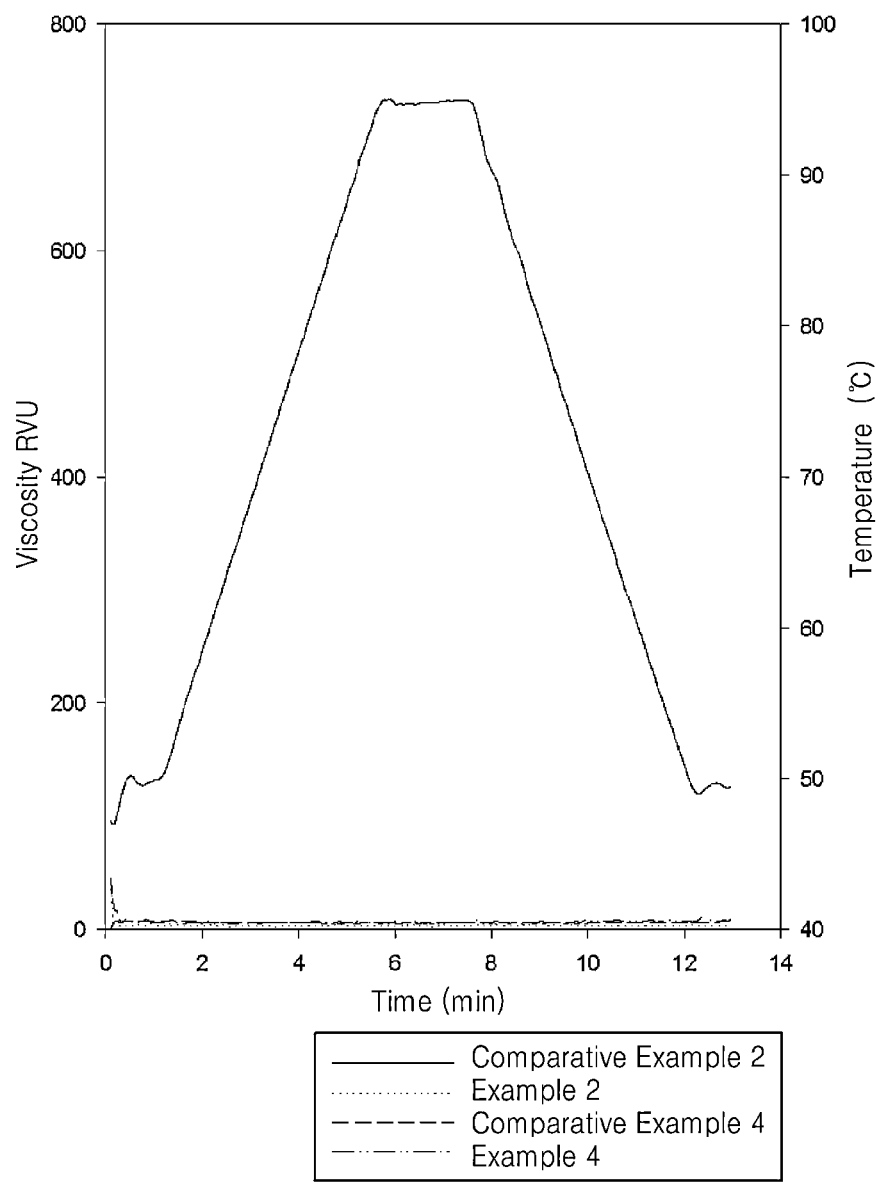
FIG. 5 is pasting property analysis results of cationic starches, granules of which are destroyed.

It could be observed that pasting initiation temperatures were 70 degrees C. in RVA pasting curves of the native starches (FIG. 3). Unlike the native starches, the viscosity of cationic starches, the granule structure of which was maintained, tended to decrease as the temperature increased and to increase when the temperature decreased again (FIG. 4). Further, it could be confirmed that pasting properties were not shown in the cationic starches, the granule structure of which was destroyed, since they had already been pasted during heat treatment at 60° C. (FIG. 5). Further, it could be observed that there was no difference in pasting properties between the cationic starches subjected to ultrahigh pressure and cationic starches prepared by a general method.

Experimental Example 4

Measuring X-Ray Diffractions of Cationic Starch

X-ray diffraction of ETMAC of the cationic starches of the present examples and the comparative examples and native starches was observed using an X-ray diffraction analyzer (D8 Advance, Bruker) at a scanning angle (2θ) of 3.5 to 40 at a rate of 5/min (at a step of 0.02) under conditions of a Cu-Ka target, 40 kV and 300 mA, and relative crystallinity was obtained by dividing an area of amorphous parts Aa by an area of crystallized parts Ac according to a method of Nara and Komiya [Nara S, Komiya T. Studies on the relationship between water saturated state and crystallinity by the diffraction to method for moistened potato starch. Starch, 35: 407-410 (1983)].

As a result, in the cationic starches, the granule structure of which was maintained, crystal parts of starch granules were partially damaged, and thus, the cationic starches tended to have lower crystallinity than that of the native starches. However, in the cationic starches, the granule structure of which was destroyed, it was observed that all crystalline areas were destroyed during heat treatment at 60° C. and only amorphous areas remained.

Figure 6:
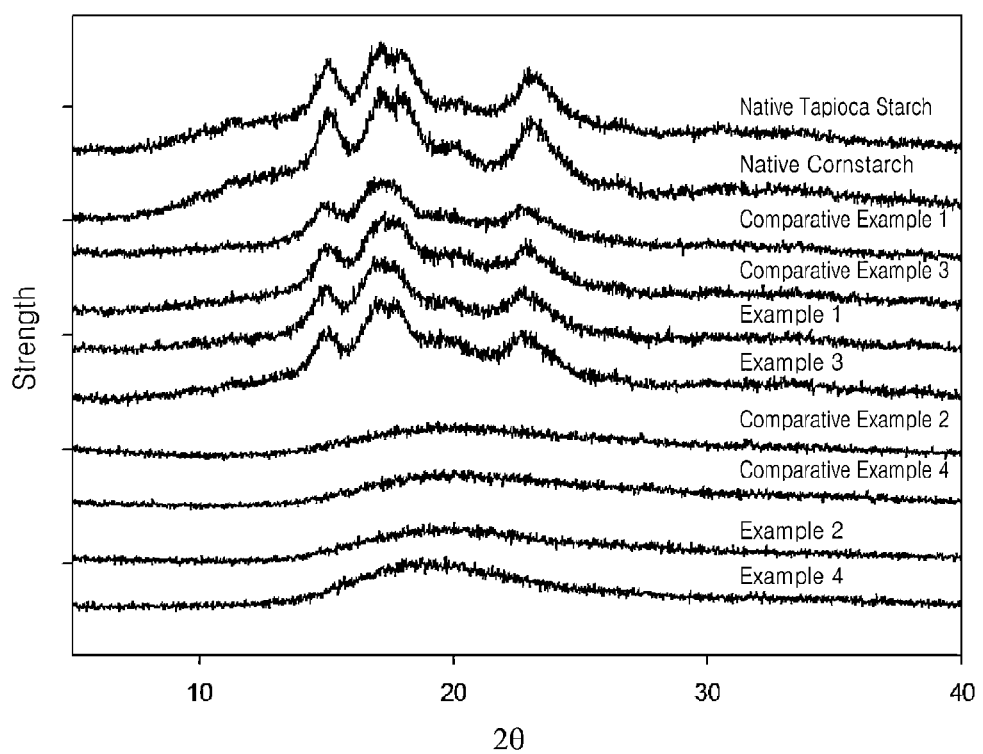
FIG. 6 is an X-ray diffraction diagram of cationic starch.

It can be seen that both the cationic starches of tapioca and corn prepared using ultrahigh pressure have higher crystallinity than the cationic starches prepared using atmospheric pressure (FIG. 6 and Table 2).

TABLE 2

| Type of starch | | Degree of relative crystallization |
|---|---|---|
| Tapioca | Native starch | 10.59 ± 0.64 |
| | Example 1 | 8.64 ± 0.31 |
| | Example 2 | 0 |
| | Comparative Example 1 | 8.31 ± 1.17 |
| | Comparative Example 2 | 0 |
| Corn | Native starch | 9.64 ± 0.33 |
| | Example 3 | 8.28 ± 0.83 |
| | Example 4 | 0 |
| | Comparative Example 3 | 7.62 ± 0.01 |
| | Comparative Example 4 | 0 |

Experimental Example 5

Solubility and Swelling Power of Cationic Starch

Elution or dissolution of cationic starches in water (solubility) and maximum water absorption capacity of starches before starch granules swelled to bursting point (swelling power) were tested. These tests were conducted by measuring solubility and swelling power of the native starches and the cationic starches prepared in Examples and Comparative Examples by modification of a method of Schoch [Schoch T. J., Swelling Power and Solubility of Granular Starches in Methods of Carbohydrate Chemistry. Whistler R L. Ed. Academic Press, New York, USA, 4: 106 (1964)]. That is, after dispersing 0.5 g of starch in 30 ml of distilled water and heating the dispersion to a temperature of 30° C. to 90° C. at intervals of 20° C. for 30 minutes, the heated dispersion was subjected to centrifugation at 3,000 rpm for 60 minutes. Thereafter, the supernatant was dried at 120° C. for 4 hours or more to measure the weight of a soluble starch, and the weight of a precipitate was measured, followed by calculating solubility and swelling power according to Expressions 2 and 3, respectively.

$$\text{Solubility}(\%) = (\text{weight of soluble starch} \times 100)/(\text{weight of dried sample}) \quad \text{<Expression 2>}$$

$$\text{Swelling power} = (\text{weight of precipitate} \times 100)/\{\text{weight of dried sample} \times (100-\text{solubility }\%)\} \quad \text{<Expression 3>}$$

As a result, although there was no large difference in solubility between the native starches at temperatures of up to 50° C., solubility rapidly increased when the increased above 50° C. It was observed that, unlike the native starches, both the cationic starches, the granule structure of which were maintained and the cationic starches, the granules structure of which were destroyed, had similar solubility from 30° C. to 90° C. without influence of temperature. Further, the cationic starches, the granule structure of which was maintained, exhibited lower solubility than the cationic starches, the granule structure of which was destroyed.

Figure 7:
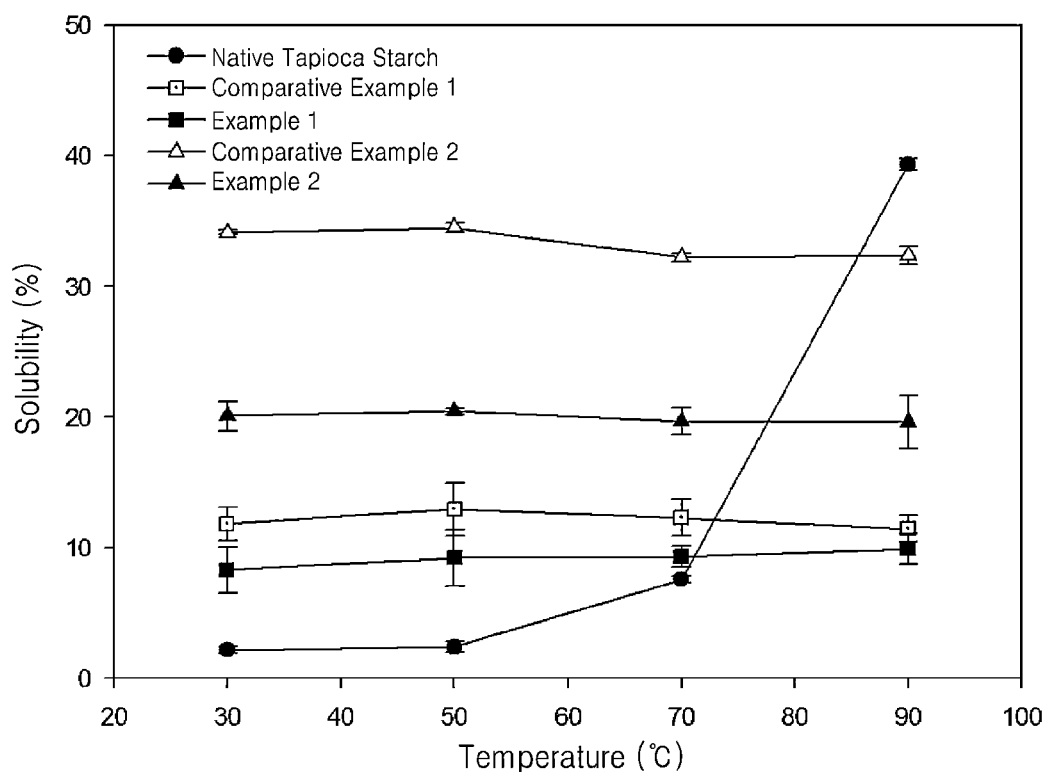
FIG. 7 shows solubility of cationic tapioca starch.

The solubility of the native tapioca starch was increased to 40% when the temperature was increased up to 90° C. On the other hand, the cationic starches, the granule structure of which was destroyed, had higher solubility than the cationic starches, the granule structure of which was maintained (FIG. 7).

Figure 8:
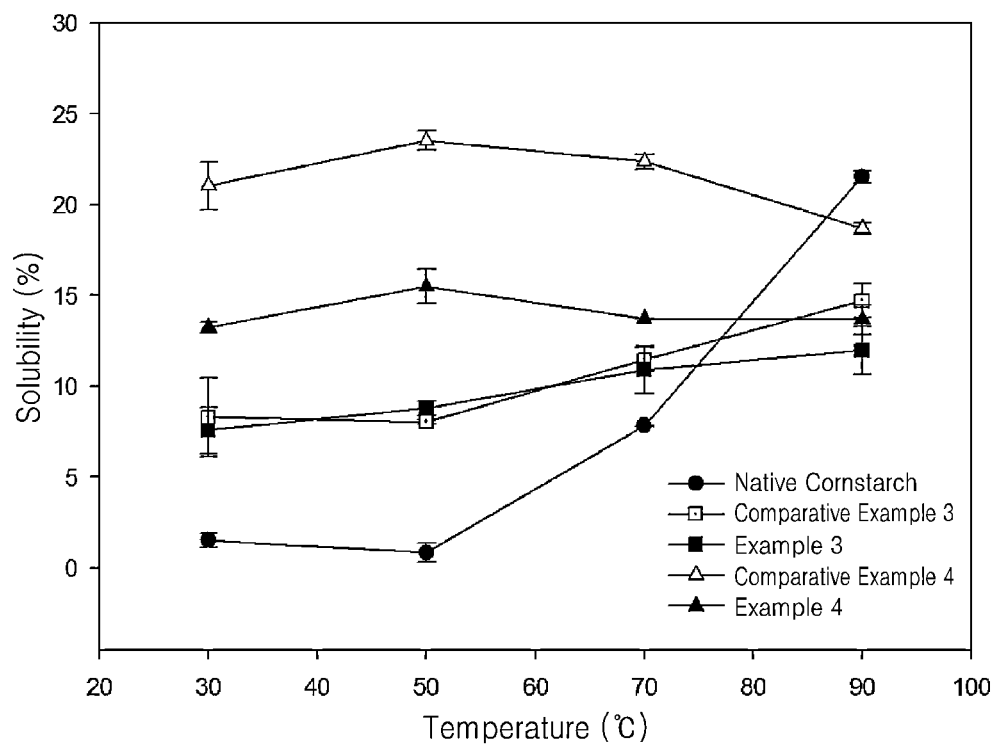
FIG. 8 shows solubility of cationic cornstarch.

The solubility of the native cornstarch was increased to 22% when the temperature was increased up to 90° C. There was an increasing tendency of the solubility of the cationic starches, the granule structure of which was maintained, as the temperature was increased to 50° C. or higher, whereas the solubility of the cationic starches, the granule structure of which was destroyed, was not greatly influenced by the temperature like the cationic tapioca starch (FIG. 8).

On the other hand, although there was no large difference in swelling power between the native starches at a temperature of up to 50° C., there was an increasing tendency of the swelling power when the temperature was increased to 50° C. or higher. It was observed that, unlike the native starches, both the cationic starches, the granule structure of which was destroyed, and the cationic starches, the granule structure of which was maintained, had similar swelling power from 30° C. to 90° C.

Figure 9:
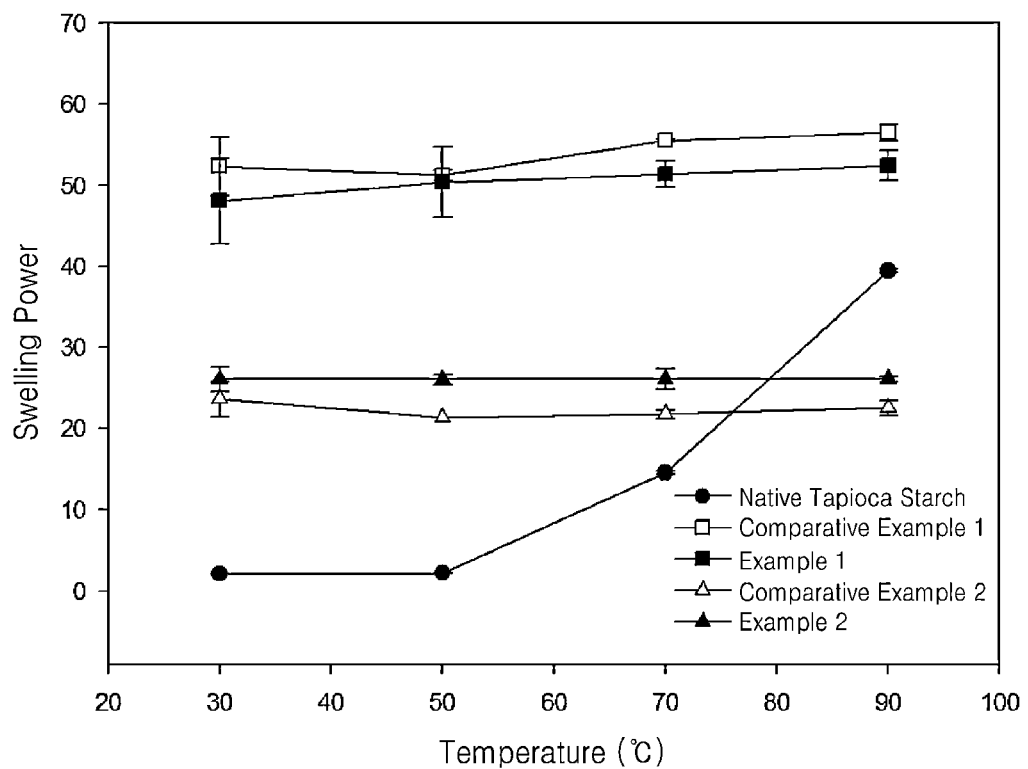
FIG. 9 shows degree of swelling of cationic tapioca starch.

The swelling power of the native tapioca starch was increased up to 40% when the temperature was increased up to 90° C. On the other hand, the swelling power of the cationic starches was not greatly influenced by temperature, and the swelling power of the cationic starches, the granule structure of which was maintained, was higher than that of the cationic starches, the granule structure of which was destroyed (FIG. 9).

Figure 10:
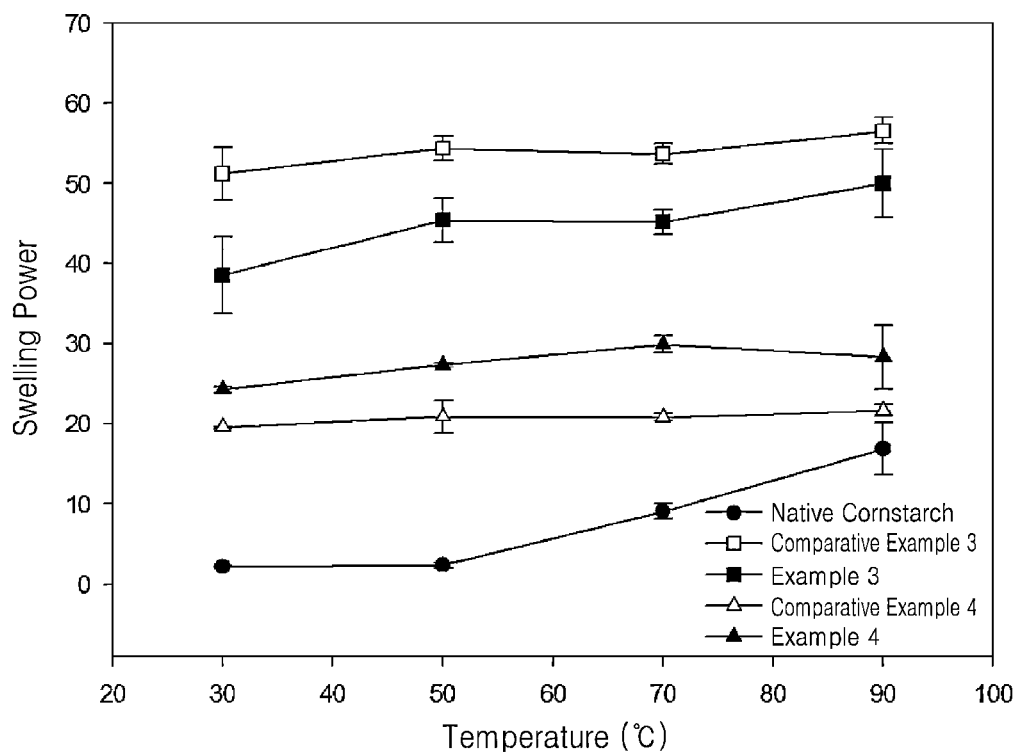
FIG. 10 shows degree of swelling of cationic cornstarch.

The swelling power of the native cornstarch was increased to 17% when the temperature was increased up to 90° C. The swelling power of the cationic starches was not greatly influenced by temperature like the cationic tapioca starch, and the swelling power of the cationic starches, the granule structure of which was maintained, was higher than that of the cationic starches, the granule structure of which was destroyed (FIG. 10).

Experimental Example 6

Flocculation of Cationic Starch

Flocculation according to concentrations of the native starches and the cationic starches was measured by modification of a method of Xie [Chenxin Xiea, Yujun Fenga, Weiping Caoa, Yu Xiaa, Zhiyong Lua. Novel biodegradable flocculating agents prepared by phosphate modification of Konjac. Carbohydrate Chemistry, (2007)]. After preparing a 1% kaolin dispersion and rapidly stirring the same for 5 minutes, native starch, a cationic starch, the granule structure of which was destroyed, and a cationic starch, the granule structure of which was maintained, were added at a concentration of 10 ppm to 100 ppm to the stirred dispersion and stirred at 300 rpm for 2 minutes. After lowering the stirring rate to 180 rpm and stirring for 5 minutes, stirring was stopped to allow precipitation. After removing a supernatant from the solution allowed to precipitate for 1 to 10 minutes, transmittance of the supernatant was measured using a spectrophotometer (UV-1200 spectrophotometer, Labentech, Korea).

Figure 11:
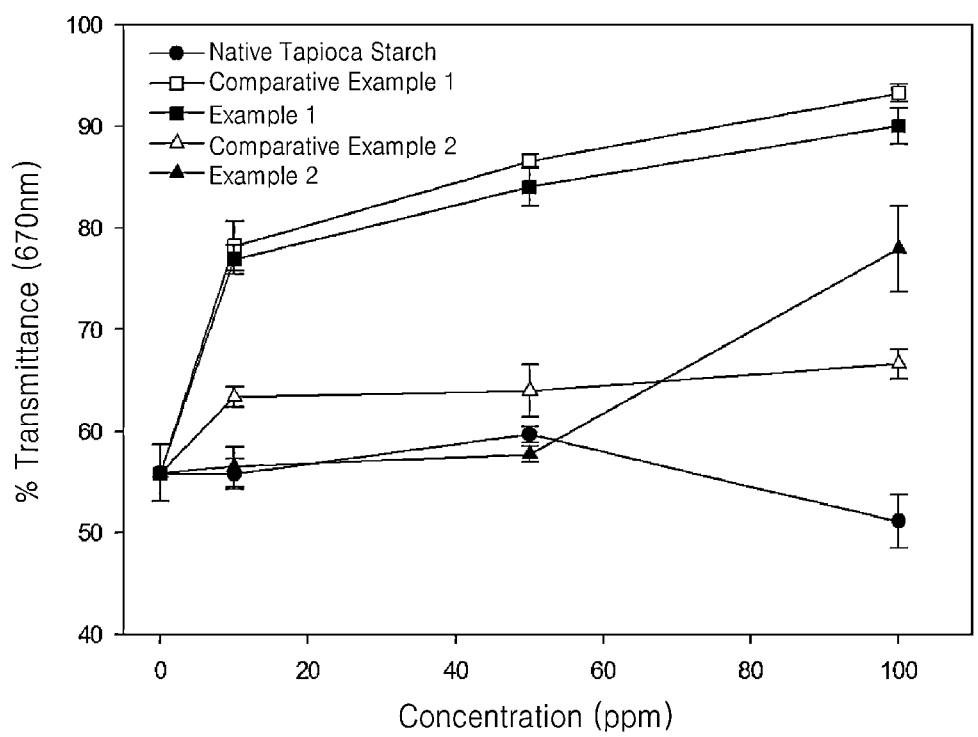
FIG. 11 shows variation in flocculation according to concentrations of cationic tapioca starch.

As a result, although the transmittance was increased with increasing added amount of the native tapioca starch, there was a decreasing tendency of the transmittance when the native tapioca starch was added in an amount of 50 ppm or more. On the other hand, the transmittance of the cationic tapioca starch tended to increase as the amount of the cationic tapioca starch added increased. A transmittance of the cationic starch, the granule structure of which was maintained, was increased up to 93% when the cationic tapioca starch was added to 100 ppm (FIG. 11).

Figure 12:
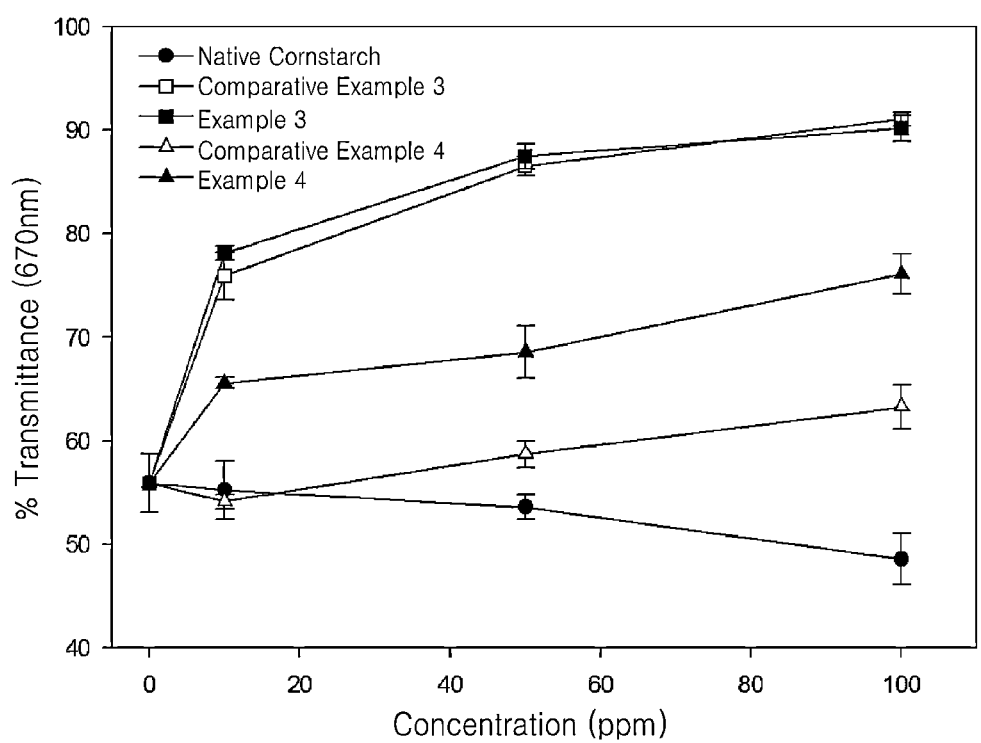
FIG. 12 shows variation in flocculation according to concentrations of cationic cornstarch.

A transmittance of the native cornstarch tended to decrease as the added amount thereof increased. It could also be observed that the transmittance of the cationic starch, the granule structure of which was maintained, was increased as the concentrations of the cationic starches (Example 3 and Comparative Example 3) were increased to 10, 50 and 100 ppm, and was higher than that of the cationic starches, the granule structure of which was destroyed, (Example 4 and Comparative Example 4) (FIG. 12).

Figure 13:
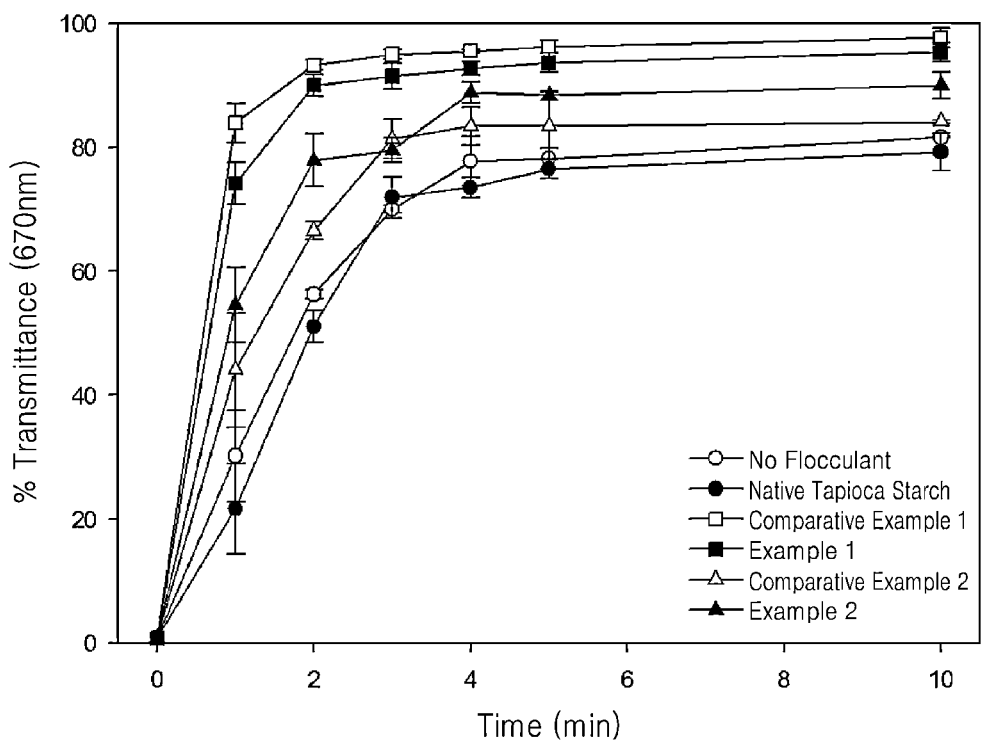
FIG. 13 shows variation in flocculation of cationic tapioca starch over time.
Figure 14:
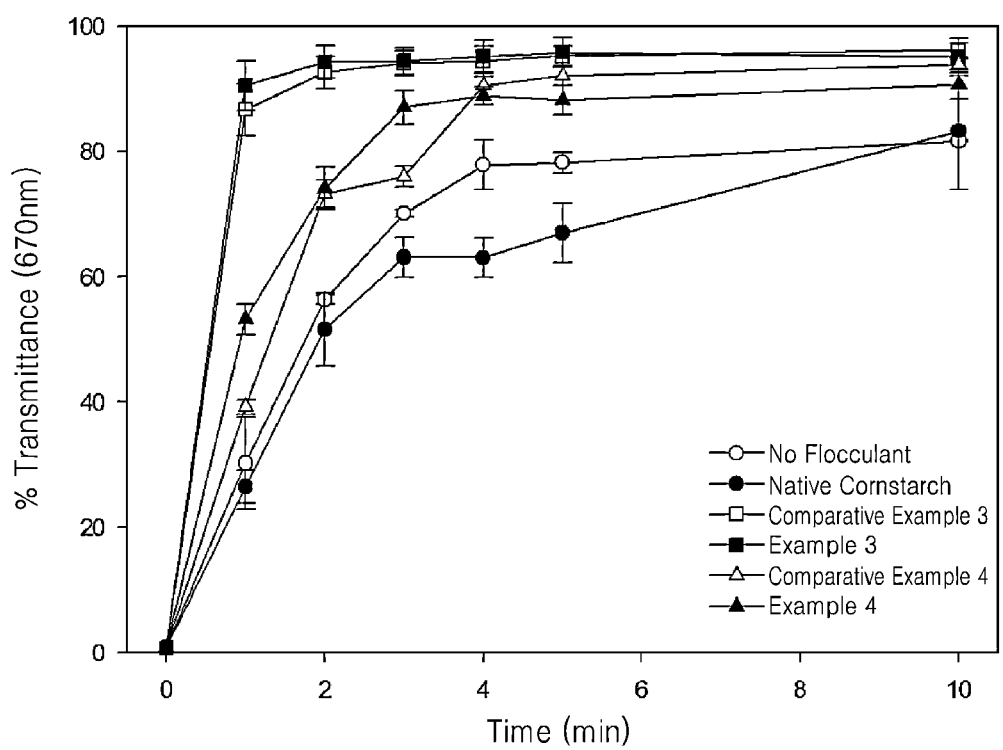
FIG. 14 shows variation in flocculation of cationic cornstarch over time.

On the other hand, as results of evaluating flocculation of cationic starches according to influence of time in a starch concentration of 100 ppm, addition of native starches resulted in lower transmittances than no addition of any starches, and it was observed that almost complete precipitation occurred when the precipitation time was 3 minutes (FIGS. 13 and 14).

Experimental Example 7

SEM Analysis of Cationic Starch

In order to confirm the granule structures of the cationic starches of Examples and Comparative Examples, SEM (Scanning Electron Microscope) analysis was conducted using a scanning electron microscope (TM3000, Hitachi, Japan).

Figure 15:
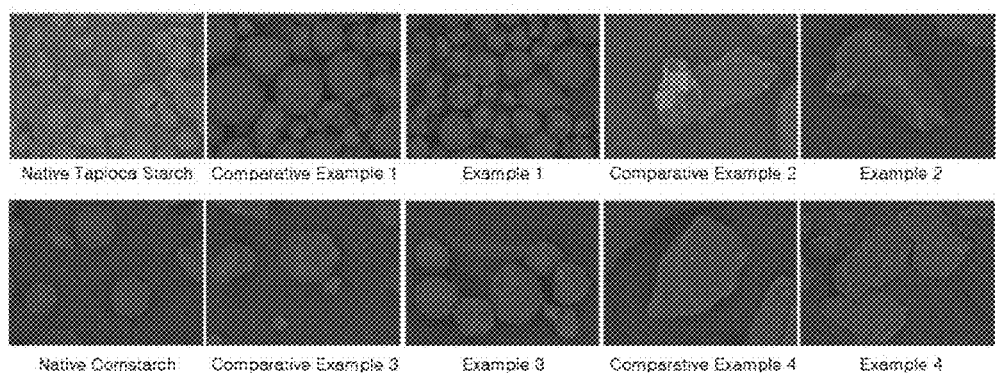
FIG. 15 is SEM images of cationic starch.

As a result, it could be confirmed that the cationic starches of Examples 1 and 3 and Comparative Examples 1 and 3 had granule structures as in native starch. On the other hand, it could be seen that the granule structures in the cationic starches of Examples 2 and 4 and Comparative Examples 2 and 4 were destroyed since the starches were pasted during heat treatment in the preparation process (FIG. 15).

As such, the method according to the present invention provides advantages of reducing preparation time of cationic starch while increasing the degree of substitution of the prepared cationic starch.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:
1. A method of preparing cationic starch, comprising:
   preparing a starch suspension containing a cationization agent;
   performing ultrahigh pressure treatment on the starch suspension; and
   obtaining cationic starch from the starch suspension subjected to ultrahigh pressure treatment.
2. The method according to claim 1, wherein the preparing a starch suspension is performed by adding the cationization agent and starch to distilled water.
3. The method according to claim 1, wherein the starch suspension comprises 150 parts by weight to 600 parts by weight of water based on 100 parts by weight of dried starch.

4. The method according to claim 1, wherein the cationization agent is added in an amount of 150 parts by weight to 300 parts by weight based on 100 parts by weight of dried starch.

5. The method according to claim 1, wherein a reaction initiator is further added to the starch suspension, followed by ultrahigh pressure treatment.

6. The method according to claim 5, wherein the reaction initiator is added before or after adding the cationization agent.

7. The method according to claim 5, wherein the reaction initiator is a base.

8. The method according to claim 7, wherein the starch suspension is brought to a pH of 9.5 to 13 by base treatment.

9. The method according to claim 1, wherein the ultrahigh pressure treatment is performed by applying ultrahigh pressure for 30 seconds to 60 minutes.

10. The method according to claim 1, wherein the ultrahigh pressure treatment is performed using water as a pressure transfer medium.

11. The method according to claim 1, wherein the obtaining cationic starch is performed by washing and drying the starch suspension.

\* \* \* \* \*